United States Patent
Graefling et al.

(10) Patent No.: US 9,991,832 B2
(45) Date of Patent: Jun. 5, 2018

(54) DETECTING BRUSHFIRE IN POWER SYSTEMS

(71) Applicant: Infineon Technologies AG, Neubiberg (DE)

(72) Inventors: Martin Graefling, Graz (AT); Christoph Seidl, Graz (AT); Guenter Hofer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days. days.

(21) Appl. No.: 15/228,865

(22) Filed: Aug. 4, 2016

(65) Prior Publication Data

US 2018/0041150 A1    Feb. 8, 2018

(51) Int. Cl.
- *H02P 1/00* (2006.01)
- *H02P 9/00* (2006.01)
- *H02P 9/04* (2006.01)

(52) U.S. Cl.
CPC ............... *H02P 9/006* (2013.01); *H02P 9/04* (2013.01)

(58) Field of Classification Search
CPC ............................... G08B 21/00; G01R 31/02
USPC .......... 318/292, 490, 400.01, 700, 701, 727, 318/799, 432; 388/836, 928; 322/53, 92, 322/98
See application file for complete search history.

(56) References Cited

U.S. PATENT DOCUMENTS

| | | | | |
|---|---|---|---|---|
| 3,727,133 A | * | 4/1973 | Marvin | G01R 31/343 318/490 |
| 4,058,804 A | * | 11/1977 | Sawada | G01R 31/34 340/635 |
| 4,163,227 A | * | 7/1979 | Sawada | G01R 31/343 322/58 |
| 4,577,151 A | * | 3/1986 | Tanisaka | G01R 31/343 324/102 |
| 6,628,893 B2 | * | 9/2003 | Ohno | H02K 23/66 318/245 |
| 2011/0215918 A1 | | 9/2011 | Jin | |

FOREIGN PATENT DOCUMENTS

RU    2013131068 A    1/2015

OTHER PUBLICATIONS

"TLE8880 Alternator Regulator with LIN Interface", Infineon Technologies AG, Dec. 2013, 2 pp.
Ultimate power—perfect control Vehicle safety, body and powertrain applications, Infineon Technologies AG, Jan. 2016, 142 pp.
"LIN alternator regulator system diagram", retrieved from internet http://www.infineon.com/cms/en/applications/automotive/powertrain/lin-alternator-regulator/ on Apr. 18, 2016, 1 pp.

\* cited by examiner

*Primary Examiner* — Antony M Paul
(74) *Attorney, Agent, or Firm* — Shumaker & Sieffert, P.A.

(57) ABSTRACT

In some examples, a detection circuit is configured to detect a brushfire in a power system based on an electrical signal from the power system. The detection circuit is further configured to set a bit in response to detecting the brushfire.

20 Claims, 15 Drawing Sheets

US 9,991,832 B2

DETECTING BRUSHFIRE IN POWER SYSTEMS

TECHNICAL FIELD

This disclosure relates to power systems with brushes, such as alternators, electric generators, and electric motors.

BACKGROUND

An alternator is a machine that generates an alternating-current ("AC") electrical signal from mechanical energy. The alternator may receive the mechanical energy in the form of a spinning shaft known as a rotor. The rotor may create a magnetic field that causes current to flow in a stationary portion of the alternator known as a stator. There are two main ways for a rotor to create a magnetic field. First, the rotor may contain a permanent magnet that creates a magnetic field that rotates with the rotor. Alternators that use a permanent magnet may be known as magnetos. Second, the rotor may create a magnetic field by having electric current pass through windings inside the rotor.

An alternator may contain a brush that provides an excitation current to the rotor to generate an electric current through the windings inside the rotor. The brush may have a brush holder that pushes the brush against the rotor. If the brush contacts the rotor, the brush may conduct an electric current with the rotor. If there is a gap between the brush and the rotor, a brushfire may occur as the potential difference between the brush and the motor creates an electric arc across the gap.

Similar configurations may exist in other power systems such as electric motors and electric generators. An electric generator may operate on similar principles as an alternator, converting mechanical energy to electrical energy. An electric motor may convert electric energy to mechanical energy. Generators and electric motors may include rotating shafts and brushes that conduct electric current to the rotating shafts.

SUMMARY

This disclosure describes techniques for a detection circuit configured to detect a brushfire in a power system based on an electrical signal from the power system. The detection circuit is further configured to set a bit in response to detecting the brushfire.

In some examples, a method includes detecting a brushfire in a power system based on an electrical signal from the power system. The method further includes setting a bit in response to detecting the brushfire.

In some examples, a system includes a rotating shaft and one or more brushes configured to conduct electricity with the rotating shaft. The system further includes a control unit, and a detection circuit configured to detect a brushfire between the rotating shaft and the one or more brushes based on an electrical signal. The detection circuit is further configured to set a bit in response to detecting the brushfire.

The details of one or more examples are set forth in the accompanying drawings and the description below. Other features, objects, and advantages will be apparent from the description and drawings, and from the claims.

DETAILED DESCRIPTION

A brushfire may damage the components within power systems including brushes. For example, a brushfire may cause high electromagnetic radiation, which may affect the performance of nearby components. A brushfire may also cause spikes in the excitation current through a rotor. Moreover, a brushfire may reduce the output voltage that the alternator can provide to a battery and other electrical loads within the system.

A power system such as an alternator may be designed to withstand spikes in the excitation current caused by brushfires. Changes in the design of an alternator may make the brushes more resistant to fatigue and may make the alternator more resilient to the potential damage caused by brushfires. In particular, an alternator control IC may be designed to withstand sharp voltage spikes at an excitation pin. Nonetheless, these designs may only mitigate the potential damage from brushfires without preventing future brushfires. A user may prevent a future brushfire by replacing a defective brush, but the user may not be aware of the defective brush unless there is diagnostic information available to the user that indicates a brushfire.

Detecting a brushfire in an alternator or another power system may be difficult if the brushfire occurs inside the alternator during the operation of the alternator. This disclosure describes techniques for detecting, monitoring, and reporting an unintended interruption of current flow through a mechanical connection, known as a brushfire, within a power system such as an alternator, an electric generator, or an electric motor. In some examples, these techniques may include sensing an electrical signal generated by a brushfire and reporting the brushfire to a user. The system may detect a spark due to a disconnection between a brush and a slip ring by detecting electric fields, magnetic fields, or a combination thereof, or by detecting a high change in current. The spark detector may detect coupled disturbances and may validate the repetition of defined signature electrical signals indicating possible brushfires. With these techniques, a diagnostic system may inform the user of the brushfire, allowing the user to replace a defective brush or brush holder to prevent further damage to the alternator and nearby components.

Figure 1:
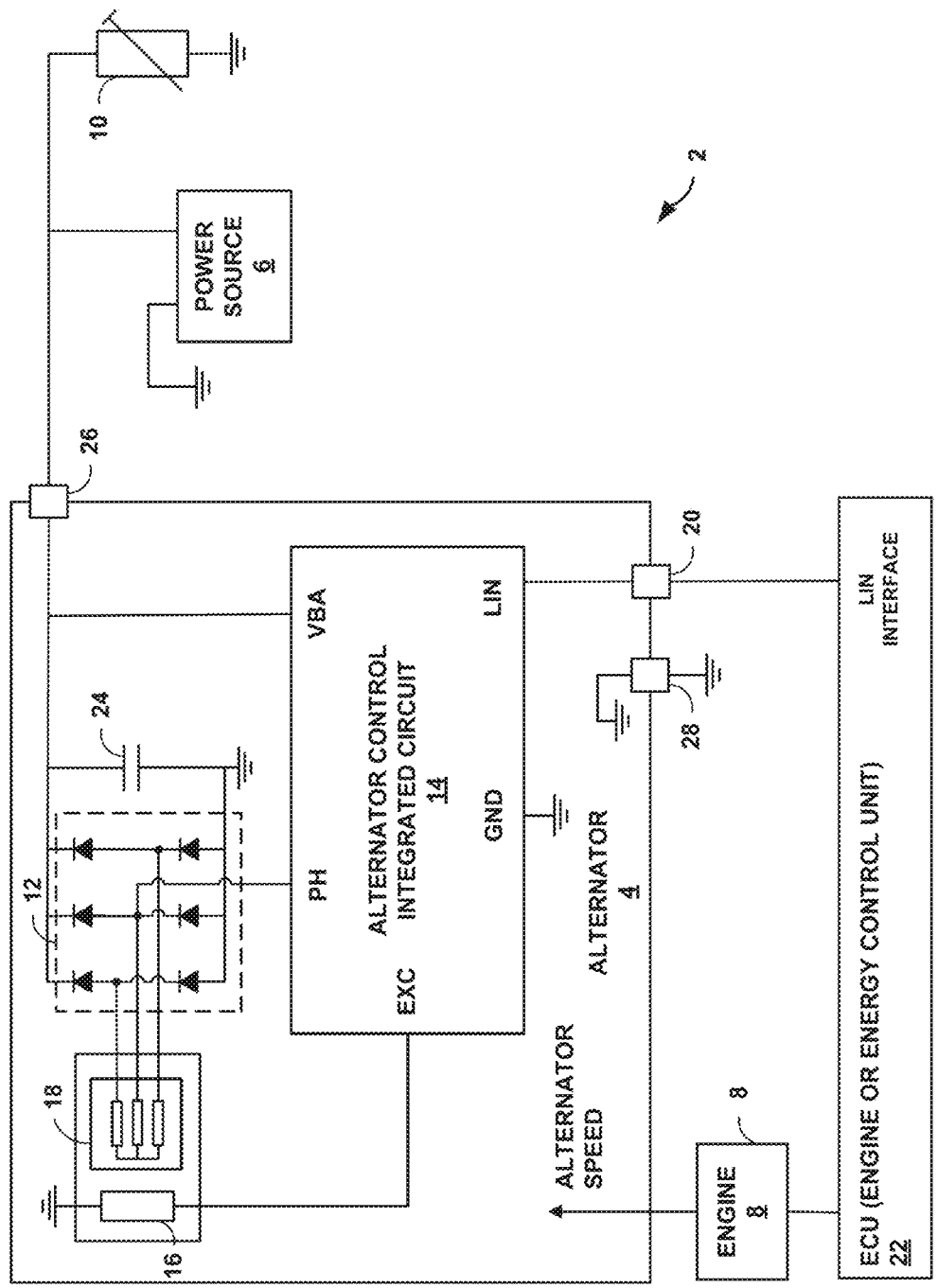
FIG. 1 is a conceptual block and circuit diagram of a system including an alternator, power source, and an engine in accordance with some examples of this disclosure.

FIG. 1 is a conceptual block and circuit diagram of a system 2 including an alternator 4, power source 6, and an engine 8 in accordance with some examples of this disclosure. System 2 may be any electro-mechanical system that converts mechanical energy to electrical energy, such as an automobile, a generator, a locomotive, a watercraft, or any other electro-mechanical system. System 2 may include other components not depicted in FIG. 1.

Alternator 4 may convert mechanical energy into electrical energy for system 2. In some examples, alternator 4 may be a similar machine for converting mechanical energy into electrical energy, such as a dynamo, a magneto, or a generator. In some examples, alternator 4 may be a machine for converting electrical energy into mechanical energy, such as an electric motor.

Alternator 4 may receive mechanical energy from engine 8 in the form of a rotating shaft such as a crankshaft. Engine 8 may control the speed of the alternator through the angular velocity of the rotating shaft, via a pulley and/or belt. For example, the rotating shaft may have an angular velocity of fifteen hundred revolutions per minute ("RPM"), which may cause alternator 4 to operate at a proportional angular velocity, perhaps three times higher than the engine RPM. Engine 8 may be an internal combustion engine, a hybrid combustion-electric engine, or any other suitable engine.

Alternator 4 may output electrical energy to power source 6 and to loads 10. Power source 6 may be a battery or an electrical energy storage device. Power source 6 may provide an initial amount of electrical energy to start engine 8 and alternator 4 when system 2 starts up. During operation of engine 8, alternator 4 may convert mechanical energy from engine 8 into electrical energy to recharge power source 6.

Loads 10 may include any subsystems within system 2 that consume electrical energy. In some examples where system 2 is an automobile, loads 10 may include heating and cooling, radio and video displays, steering assistance, power windows, and other subsystems. Alternator 4 may produce an AC electrical signal and convert the AC signal, using rectifier bridge 12, to a direct current ("DC") signal to deliver to power source 6 and loads 10.

Alternator 4 may include an alternator control integrated circuit ("IC") 14 with several pins for input and output. These pins may include an excitation pin ("EXC"), a local interconnect network pin ("LIN"), a ground pin ("GND"), a phase pin ("PH"), and a battery pin ("VBA").

Through the ECX pin, alternator control IC 14 may regulate an output voltage of alternator 4 by varying an electrical signal known as an excitation current. Alternator control IC 14 may use a pulse-width modulated ("PWM") controlled voltage signal to vary the excitation current. The EXC pin may be connected to one or more coils or windings in rotor 16 so that the excitation current travels through rotor 16. The EXC pin may be connected to rotor 16 via one or more brushes (not shown in FIG. 1).

Alternator 4 may have one or more brushes for delivering the excitation current to rotor 16. A brushfire may occur at the interface between a brush and rotor 16, as described more fully below. The brushfire may occur for many reasons, including deformation of the brushes or faulty brush holders. When a brushfire occurs, alternator control IC 14 may receive an electrical signal at the EXC pin. Alternator control IC 14 may detect a brushfire based on the electrical signal and set a bit, such as engine control unit ("ECU") 22. In some examples, alternator control IC 14 may include a control unit for reading the bit indicating a brushfire, or ECU 22 may read the bit.

The LIN pin on alternator control IC 14 may be connected to ECU 22 via LIN bus 20. In automotive applications, LIN bus 20 may be connected to other components in an automobile, such as a steering wheel, seats, climate controls, and other components. If system 2 is not an automotive system, system 2 may still include a connection between alternator control IC 14 and ECU 22 that is similar to LIN bus 20.

The GND pin on alternator control IC 14 may be connected to a reference ground within system 2. In some examples, the reference ground may correspond to the potential of a vehicle chassis or the potential of some other suitable material in system 2. Alternator 4 may be connected to the reference ground via ground connection 28. The term "reference ground" generally refers to any known reference voltage or potential, and does not necessarily correspond to any specific voltage level.

The PH pin on alternator control IC 14 may be connected to two or more of the phases of stator windings 18. Alternator control IC 14 may monitor two or more phases of stator windings 18 via the PH pin. In some examples, the PH pin may be connected directly to stator windings 18, which may include three phases. Stator windings 18 may conduct current to rectifier bridge 12 based on a rotating magnetic field produced by rotor 16. Stator windings 18 may deliver an AC signal with one or more phases to rectifier bridge 12, which may convert the AC signal to a DC signal. Capacitor 24 may smooth the DC signal as the DC signal travels along battery line 26 to charge power source 6 or deliver electricity to loads 10.

The VBA pin of alternator control IC 14 may be connected to battery line 26. Alternator control IC 14 may measure the voltage on battery line 26 and adjust the excitation current that alternator control IC 14 delivers to rotor 16 via the EXC pin. Thus, alternator control IC 14 may form a closed loop feedback network, whereby alternator control IC 14 regulates the voltage on battery line 26 at a precise value by adjusting the excitation current.

Alternator control IC 14 may sense a brushfire in alternator 4 via the EXC pin or via another source. A brushfire may occur in rotor 16 at or near the connection between rotor 16 and one or more brushes (not shown in FIG. 1). Alternator control IC 14 may detect a brushfire by receiving a signal from rotor 16 in alternator 4 via EXC pin. In some examples, alternator control IC 14 may use an antenna (not shown in FIG. 1) to detect an electromagnetic signal that is generated by a brushfire.

In response to detecting a brushfire, alternator control IC 14 may set a bit, e.g., an error flag, in a memory device (not shown in FIG. 1) to indicate that a brushfire was detected. Alternator control IC 14 may set a bit in a memory device, such as a status register, flip-flop, or a state machine, in response to detecting the brushfire. The bit may include multiple bits that indicate one or more characteristics of the brushfire, such as the peak amplitude, the duration, the frequency, or the number of brushfires that were detected.

In some examples, the control unit may read the bit from alternator control IC 14. The control unit, such as ECU 22, may act as a master by requesting a status of the bit from the alternator control IC 14. Alternator control IC 14 may act as a slave by responding to the control unit with a signal indicating the status of the bit, which may indicate whether a brushfire has occurred. The signal indicating the status of the bit may be a transmission of data and/or an electrical signal from alternator control IC 14 to the control unit. The bit may indicate the status of alternator control IC 14.

Without a detection circuit, system 2 may not recognize or detect a brushfire within alternator 4, unless the brushfire prevents alternator 4 from outputting an appropriate voltage to battery line 26. A brushfire may reduce the output voltage from alternator 4 at battery line 26. In some examples, power source 6 may have a twelve-volt rating, and recharging power source 6 may require at least thirteen volts or fourteen volts from battery line 26. Thus, if alternator 4 is not providing an appropriate voltage at battery line 26, alternator control IC 14 may detect a brushfire by sensing the output voltage at the VBA pin. However, the voltage at battery line 26 may decrease for many reasons other than a brushfire, making it difficult for alternator control IC 14 to determine the cause of declining voltage at battery line 26.

However, a brushfire may not significantly reduce the maximum available power or the output voltage generated by alternator 4 to battery line 26. In some examples, the maximum available power generated by alternator 4 may decrease before the output voltage of the alternator. Thus, other techniques for detecting and reporting a brushfire to a user may be beneficial to alternator 4. Even if the brushfire does not prevent alternator 4 from outputting the appropriate voltage, the brushfire may damage alternator 4 and nearby components. The brushfire may generate electromagnetic waves and cause erratic excitation currents that damage alternator 4 and nearby components. Therefore, it is beneficial for a detection circuit to detect brushfires, even if the brushfires do not substantially reduce voltage on battery line 26.

Figure 2:
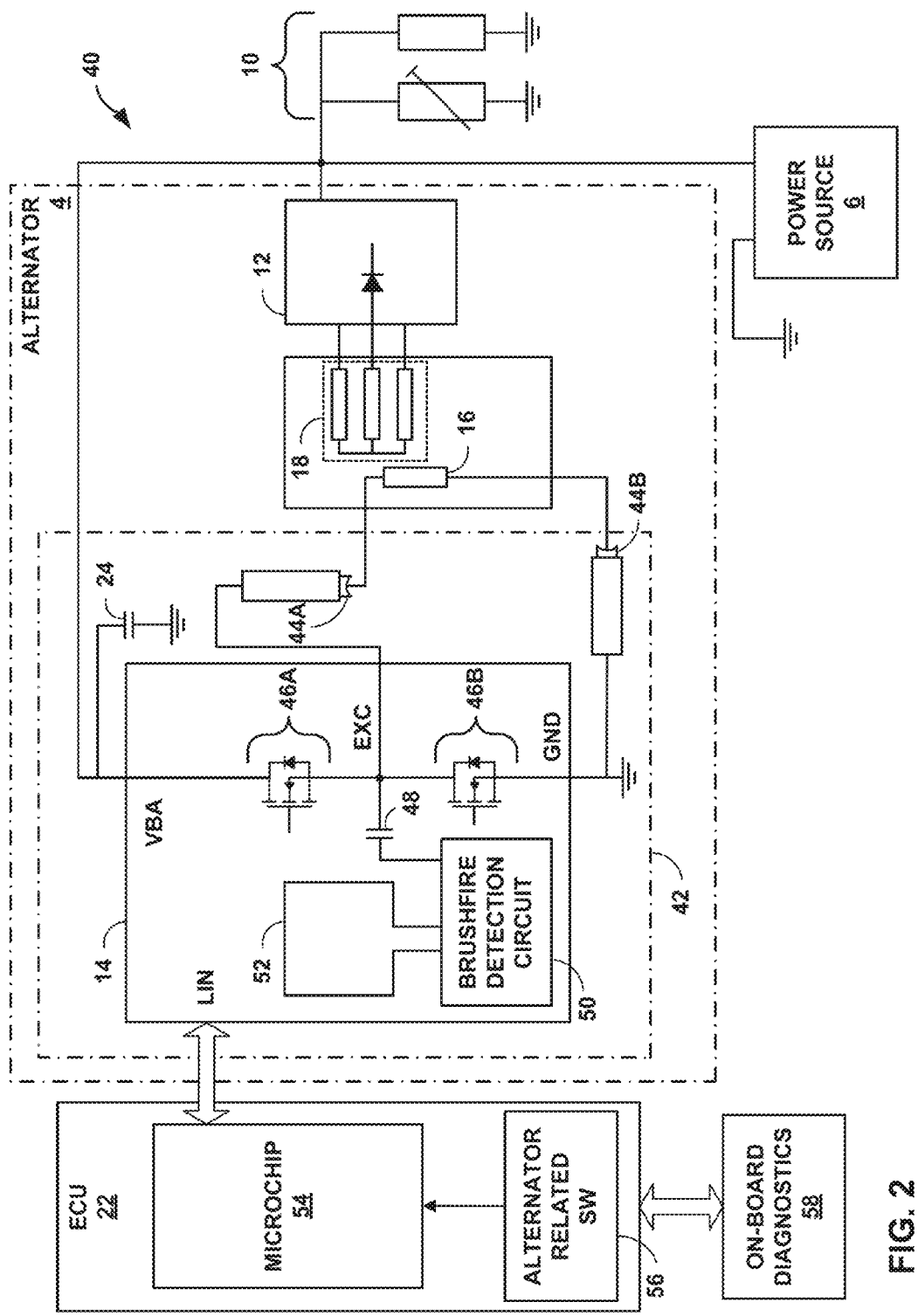
FIG. 2 is a conceptual block and circuit diagram of a system including an alternator, power source, and an engine control unit in accordance with some examples of this disclosure.

FIG. 2 is a conceptual block and circuit diagram of a system 40 including an alternator 4, power source 6, and an engine control unit 22 in accordance with some examples of this disclosure. System 40 may be any electro-mechanical system that includes a power system to convert mechanical energy to electrical energy, such as an automobile, a generator, a locomotive, a watercraft, or any other electro-mechanical system. System 40 may be similar to system 2 in FIG. 1 and may include other components not depicted in FIG. 2.

Alternator control IC 14 and brush 44A may be located in brush holder 42, which may be located within alternator 4. Alternator 4 may also include rotor 16, stator windings 18, and rectifier bridge 12. Alternator control IC 14 may include several pins, such as EXC, LIN, GND, and VBA, similar to alternator control IC 14 in FIG. 1.

Two or more brushes 44 may deliver an excitation current from alternator control IC 14 to rotor 16. One or more spring-loaded brush holders 42 may push each of brushes 44 against rotor 16. The EXC pin of alternator control IC 14 may be connected to two or more brushes 44, such as brush 44A, and the GND pin may be connected to brush 44B. Inside alternator control IC 14, the EXC pin may be connected to switches 46A, 46B and to brushfire detection circuit 50 via capacitor 48.

Switches 46 may be transistors or any other suitable analog or digital device that conducts electricity based on a control signal. Switch 46A may conduct electricity from the VBA pin to the EXC pin, based on a control signal at a control node of switch 46A, such as a gate or base. The VBA pin may be connected to the output of alternator 4. Switch 46B may conduct electricity from the GND pin to the EXC pin, based on a control signal. By opening and closing, switches 46 may regulate the excitation current delivered to rotor 16 via brush 44A.

When a brushfire occurs at one of brushes 44, alternator control IC 14 may receive an electrical signal indicating the brushfire at the EXC pin of alternator control IC 14. Brushfire detection circuit 50 may receive the signal indicating the brushfire from the EXC pin via capacitor 48. Capacitor 48 may be part of an optional filter circuit that differentiates the electrical signal to block low frequency signals and allow higher frequency signals to pass. A brushfire may start and stop quickly, generating a high-frequency signal at the EXC pin. As a result, capacitor 48 may allow passage of the signal indicating a brushfire, while blocking other signals.

As an alternative or a supplement to capacitor 48, brushfire detection circuit 50 may detect a signal indicating a brushfire via antenna 52. Antenna 52 may comprise a dipole structure or a ring structure with one or more windings. Antenna 52 may comprise any structure capable of detecting electromagnetic fields, such as electric fields, magnetic fields, or a combination thereof. A brushfire may generate an electromagnetic wave that propagates to antenna 52. Antenna 52 may receive and convert the electromagnetic wave into an electrical signal. Antenna 52 may then transmit the electrical signal to brushfire detection circuit 50. Either antenna 52 or capacitor 48, or a combination or modification of one or both, may detect a brushfire in alternator 4. In some examples, brushfire detection circuit 50 may be connected to only one of antenna 52 or capacitor 48, and not both components.

Brushfire detection circuit 50 may include filter circuitry to differentiate between electrical signals associated with brushfires and other electrical signals. For example, brushfire detection circuit 50 may include debounce circuitry to distinguish between brushfires and other electrical signals and electromagnetic waves that are not associated with brushfires.

When brushfire detection circuit 50 detects a brushfire, alternator control IC 14 may set a bit, e.g., an error flag, in a memory device to mark the event. Alternator control IC 14 may set a bit for ECU 22 to read via the LIN bus, a CAN bus, or another mode of communication. Microchip 54 in ECU 22, which may include alternator related software ("SW") 56, may read the status of the bit in alternator control IC 14. The bit may include data relating to the bit and/or an error flag for the brushfire, along with other error flags in alternator control IC 14. ECU 22 may access the memory device to determine if brushfire detection circuit 50 has set an error flag.

ECU 22 may output diagnostic information indicating the brushfire to on-board diagnostics 58, which may include a user interface. On-board diagnostics 58 may inform a user of the brushfire via the user interface. On-board diagnostics 58 may provide a failure read-out to a mechanic during an inspection or, where system 40 is an automotive system, during a garage visit. The failure read-out may include data relating to the error flags set by alternator control IC 14 to ECU 22.

Figure 3:
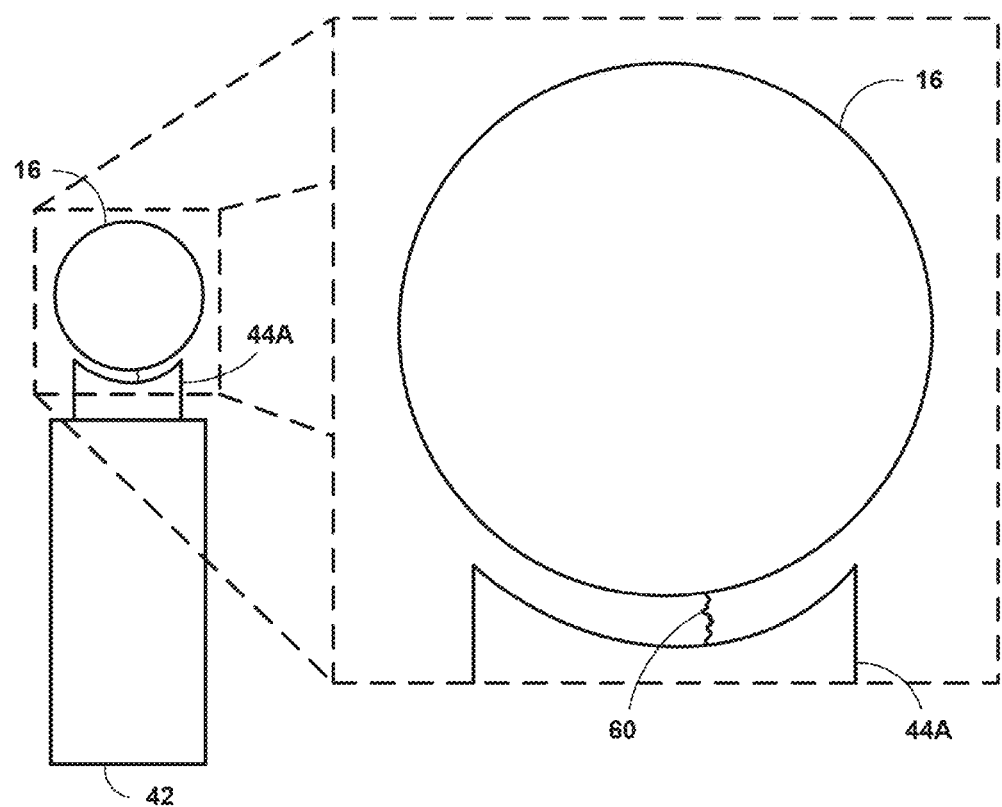
FIG. 3 is a conceptual block diagram of a brushfire occurring between a brush and a rotor in accordance with some examples of this disclosure.

FIG. 3 is a conceptual block diagram of a brushfire 60 occurring between a brush 44A and a rotor 16 in accordance with some examples of this disclosure. Rotor 16 may be spinning in place, while brush holder 42 and brush 44A may be stationary. Depending on the power system and the brush, brush 44A may be conducting an electrical current to rotor 16 or receiving an electrical current from rotor 16. In the example of an alternator, rotor 16 may include one or more internal windings that conduct the excitation current and produce a rotating magnetic field.

Brush holder 42 may use a spring to push brush 44A against rotor 16. When brush 44A is in contact with rotor 16, brush 44A may conduct an excitation current to or from rotor 16. If there is a gap between brush 44A and rotor 16, possibly due to a defect in brush 44A or brush holder 42, a potential difference may arise between brush 44A and rotor 16. Depending on the potential difference, the size of the gap, and other factors, brushfire 60 may occur.

Brushfire 60 may be an electrical arc across air or another insulating material between brush 44A and rotor 16. Brushfire 60 may generate an electromagnetic wave based on one or more characteristics of brushfire 60, such as the duration of brushfire 60 or the peak amplitude of the current or the voltage in brushfire 60. Brushfire 60 may also affect the excitation current that is traveling through brush 44A and rotor 16. Brushfire 60 may cause a spike in the amplitude of the excitation current.

Figure 4:
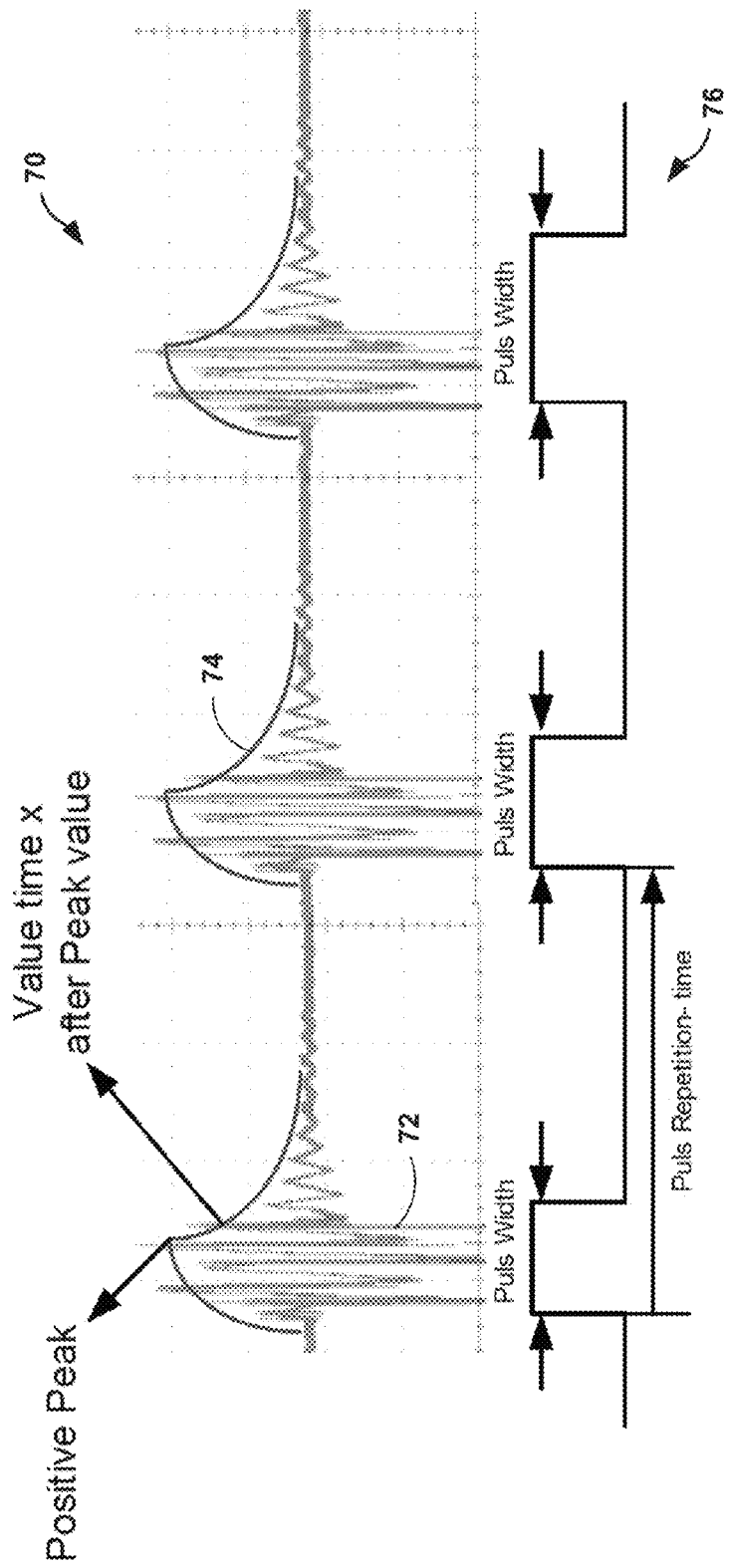
FIG. 4 is a graphical comparison of two graphs of electrical signals that may indicate brushfires in accordance with some examples of this disclosure.

FIG. 4 is a graphical comparison of two graphs 70, 76 of electrical signals that may indicate brushfires in accordance with some examples of this disclosure. Graph 70 may depict an electrical signal with three pulses. The vertical axis of graph 70 may represent the amplitude of an electrical current or voltage. The horizontal axis of graphs 70, 76 may represent time.

AC wave 72 may represent an electrical signal indicating or generated by a brushfire. A brushfire may cause very high and steep voltage peaks to occur at the EXC pin of an alternator control IC. Under normal operation, the voltage at the EXC pin may be stable. In some examples, the electrical signal depicted by AC wave 72 may travel through brush 44A to alternator control IC 14. AC wave 72 may also be an electrical signal from an antenna that receives an electromagnetic wave generated by a brushfire. For each pulse in graph 70, the AC wave 72 may increase in amplitude and then decrease in amplitude after peaking. As depicted in graph 70, each pulse may have a rise time and a fall time.

Smoothed curve 74 may be a smoothed approximation of the amplitude of AC wave 72. Smoothed curve 74 may result after AC wave 72 passes through a filter circuit. The filter circuit may include an AC/DC converter and/or an impedance element with a time constant.

Graph 76 depicts an example of the width of each pulse in graph 70. Each pulse in graph 76 depicts a duration of time that smoothed curve 74 exceeds a threshold amplitude. Graph 76 also depicts the pulse repetition time of the pulses in graph 70. The pulse repetition time may measure the frequency of brushfires. The pulse widths in graph 76 may be measured by the amount of time that the amplitude of smoothed curve 74 is higher than a threshold amount.

Figure 5:
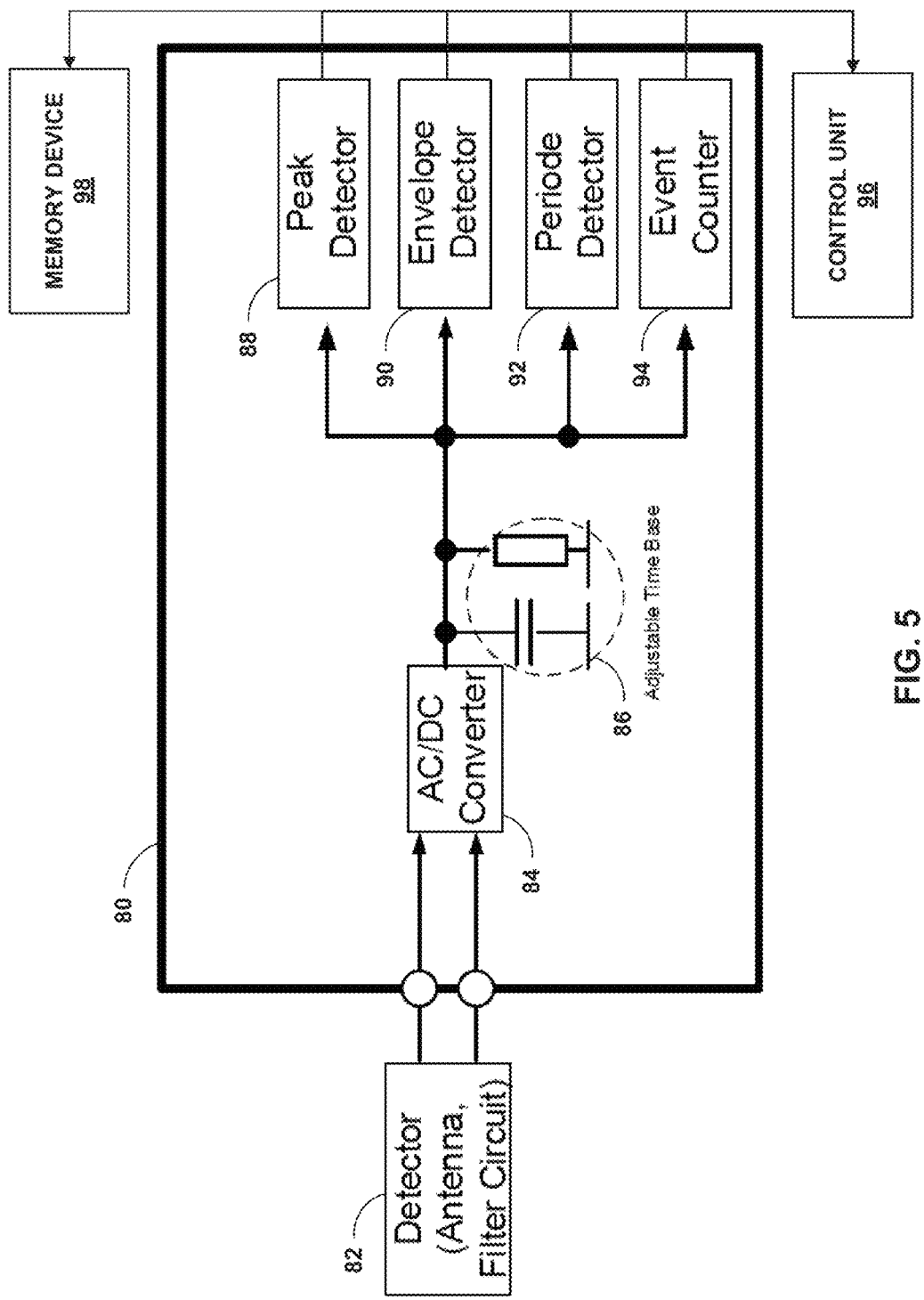
FIG. 5 is a conceptual block and circuit diagram of a detection circuit in accordance with some examples of this disclosure.

FIG. 5 is a conceptual block and circuit diagram of a detection circuit 80 in accordance with some examples of this disclosure. Detection circuit 80 may be located within an alternator control IC, within a brush holder, on a battery line, within an alternator or power system, or at another suitable location. Detection circuit 80 may contain circuitry configured to receive and detect an electrical signal from detector 82 indicating a brushfire. Detection circuit 80 may be further configured to measure one or more characteristics of the electrical signal, such a peak amplitude, a duration, or a frequency of the electrical signal. The characteristics of the electrical signal may also include the excitation current, the pole pair count, or the rotational speed of the rotor. Detection circuit 80 may contain AC/DC converter 84 and impedance element 86.

Detector 82 may be an antenna or a filter circuit, such as antenna 52 or capacitor 48 in FIG. 2. Antenna 52 may be a contact-less detector, and capacitor 48 may be a contact-based detector. Detector 82 may be located outside of detection circuit 80. As an antenna, detector 82 may be located a suitable distance from the brushes in order to receive an electromagnetic wave from a brushfire. As a filter circuit, detector 82 may contain a capacitor that is connected to the EXC pin of an alternator control IC. The EXC pin may receive the electrical signal from the brush, and detector 82 may filter or differentiate the electrical signal and deliver it to the detection circuit 82. In some examples, detector 82 may be connected to the EXC pin, an internal node, the VBA pin on the battery line, or to a gate terminal of an excitation switch. Detector 82 may be located in the alternator control IC, in the brush holder, or close to the brushes, such as on top of the brush holder. Detector 82 may be outside of the alternator, such as on the battery line on the ECU or at any node or block that receives a coupled signal on the alternator control IC, such as the gate driver to the EXC pin. Detector 82 may be connected to a gate of one or more internal power switches within the alternator control IC.

AC/DC converter 84 within detection circuit 80 may convert the electrical signal from a high-frequency AC signal to a low-frequency signal. As shown in FIG. 4, the incoming electrical signal may be a sinusoidal waveform, such as AC wave 72, defining a signal amplitude that changes over time. AC/DC converter 84 may transform the electrical signal to a low-frequency signal defining a signal amplitude that resembles the amplitude of the AC signal.

Impedance element 86 may smooth the low-frequency signal that AC/DC converter 84 outputs. Impedance element 86 may create a time constant based on the resistance and reactance of impedance element 86, which may be coupled to a reference ground, such as the GND pin of an alternator control IC. If impedance element 86 contains a resistor and capacitor in parallel with components 88, 90, 92, 94, the time constant may be proportional to the product of a resistance and a capacitance of impedance element 86. As shown in FIG. 4, AC/DC converter 84 and impedance element 86 may output a low-frequency signal, such as smoothed curve 74, that resembles a shark fin with a relatively short rise time and a longer fall time. The output low-frequency signal may be based on the input AC electrical signal, as shown in FIG. 4 as AC wave 72. Together, AC/DC converter 84 and impedance element 86 may act as a filter circuit or a smoothing circuit. In some examples, impedance element 86 may be a part of peak detector 88 and/or envelope detector 90. Impedance element 86 may or may not be coupled between AC/DC converter 84 and peak detector 88, envelope detector 90, period detector 92, and event counter 94.

Peak detector 88, envelope detector 90, period detector 92, and event counter 94 may determine and store one or more characteristics of the brushfire. Peak detector 88 may determine the peak amplitude for each electrical signal received by detection circuit 80. Envelope detector 90 may determine the time duration for each electrical signal received by detection circuit 80. Period detector 92 may determine the time period between electrical signals received by detection circuit 80. The time period between electrical signals may be the same as the pulse repetition time in FIG. 4. The time period may be related to the frequency of brushfires. Event counter 94 may store a running count of the number of electrical signals received by detection circuit 80. Event counter 94 may use a threshold amplitude or duration to determine whether each electrical signal indicates a brushfire. The threshold for detecting a brushfire may use peak detector 88, envelope detector 90, period detector 92, and event counter 94, and the threshold may be adjustable.

Control unit 96 or detection circuit 80 may store data in memory device 98 relating to one or more characteristics of the brushfires. In some examples, control unit 96 may be located in an alternator control IC or an engine control unit. Detection circuit 80 may set a bit in response to detecting a brushfire. The bit may include diagnostic information indicating one or more characteristics of the brushfire. Control unit 96 may read the bit and output the diagnostic information indicating the brushfire to a user interface. The user interface may be a diagnostic tool that scans the components in a system and displays information to a user.

Memory device 98 may be configured to store error flags relating to brushfire and other events in a power system. Memory device 98 may also store bits or alerts relating to brushfires. The error flags, alerts, and/or bits may include information relating to one or more characteristics of the brushfire(s), such as the peak amplitude, the duration, the frequency, and the number of brushfires. Memory device 98 may include volatile memory or non-volatile memory.

Figure 6:
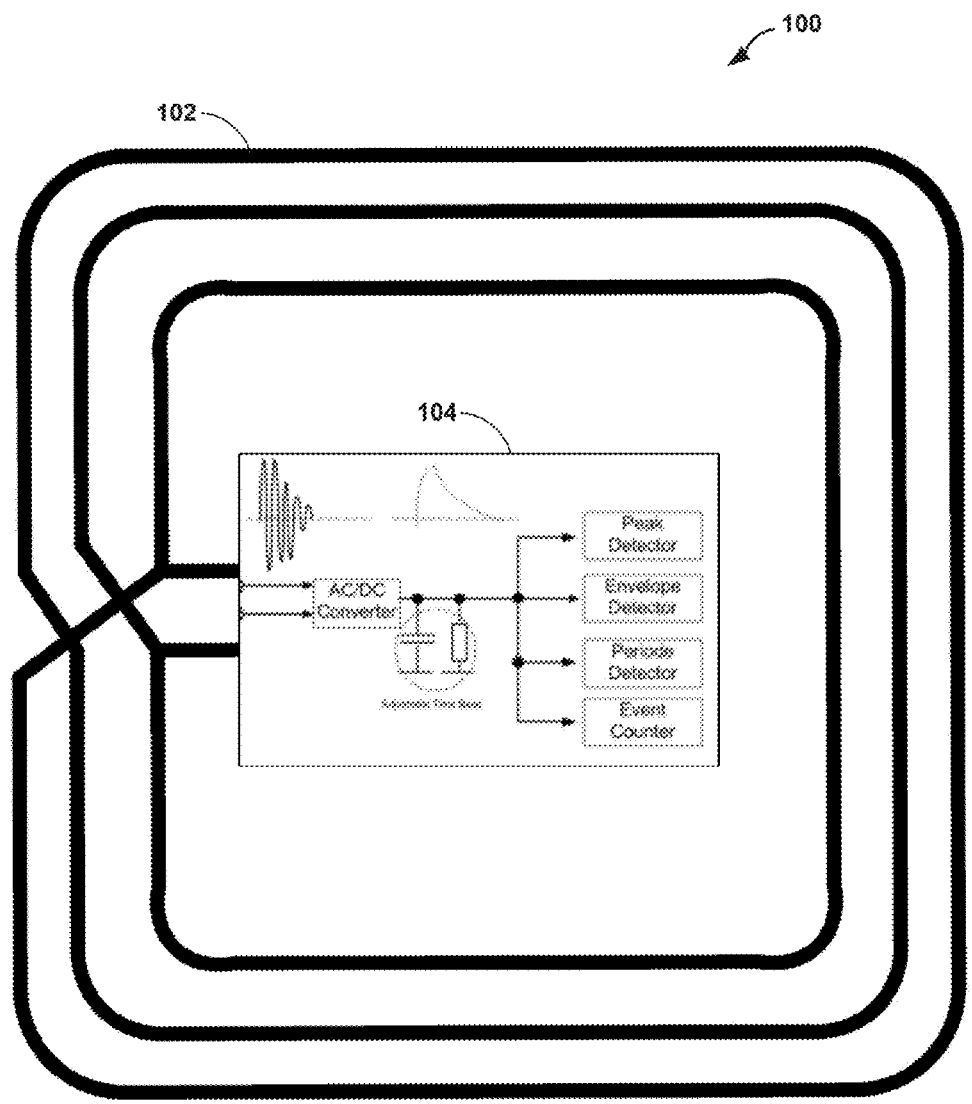
FIG. 6 is a conceptual block and circuit diagram of a detection circuit coupled to an antenna in accordance with some examples of this disclosure.

FIG. 6 is a conceptual block and circuit diagram of a detection circuit 104 coupled to an antenna 102 in accordance with some examples of this disclosure. Integrated circuit 100 may include both antenna 102 and detection circuit 104. In some examples, antenna 102 may be located outside of integrated circuit 100. Integrated circuit 100 may be located in an alternator control IC, on the battery line, or at another suitable location for detecting electromagnetic waves generated by a brushfire.

As depicted in FIG. 6, antenna 102 may be located on integrated circuit 100. Antenna 102 may be similar to antenna 52 in FIG. 2 or detector 82 in FIG. 5. Antenna 102 may be coupled to detection circuit 104 such that antenna 102 can transmit electrical signals to detection circuit 104. Detection circuit 104 may be similar to brushfire detection circuit 50 in FIG. 2 or detection circuit 80 in FIG. 5. Antenna 102 may receive an electromagnetic wave generated by a brushfire, and antenna 102 may convert the electromagnetic wave into an electrical signal. Antenna 102 may then transmit the electrical signal to detection circuit 104, where an AC/DC converter and an impedance element may convert the electrical signal to a smoothed low-frequency signal, as described with respect to FIG. 5. Detection circuit 104 may operate in a similar manner to detection circuit 80 in FIG. 5.

Figure 7:
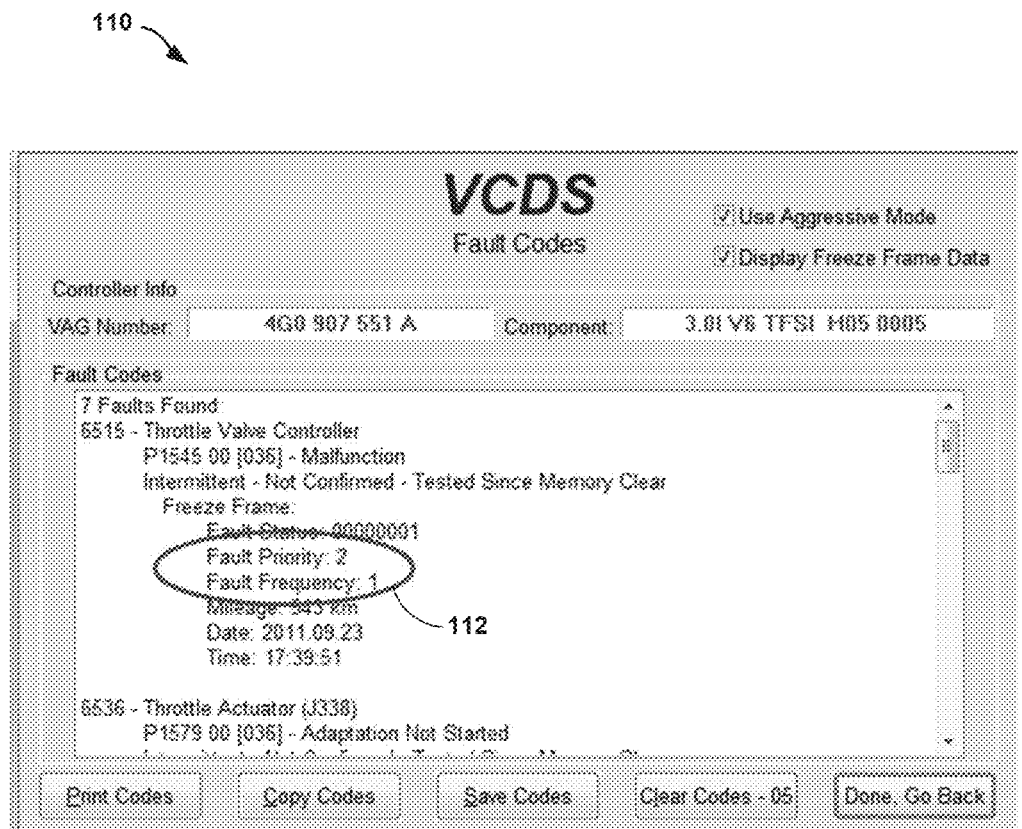
FIG. 7 illustrates a diagnostic user interface showing an output indicating one or more characteristics of a brushfire in accordance with some examples of this disclosure.

FIG. 7 illustrates a diagnostic user interface 110 showing an output indicating one or more characteristics of a brushfire in accordance with some examples of this disclosure. Diagnostic user interface 110 may receive information from an on-board diagnostics system. Diagnostic user interface 110 is an example of a means for a user receiving diagnostic information from a power system. Diagnostic user interface 110 may include information relating to a power system or other components within a larger system. In some examples, if the power system is an alternator and the larger system is an automobile, diagnostic user interface 110 may include information relating to the performance of the alternator, the engine, the battery, and other components within the automobile. In some examples, a user may receive the diagnostic information through an over-the-air update, rather a diagnostic tool that directly connects to the power system. An over-the-air update may facilitate the wireless exchange of information, such as diagnostic information, between a user and a power system.

The one or more characteristics of the brushfires may include the peak amplitude of each of the brushfires, the duration of the brushfires, the frequency of the electrical brushfires, or a number of brushfires. As shown in FIG. 7, diagnostic user interface 110 may report fault information 112 to the user. Fault information 112 may instruct the user how to react to the possible faults in a power system. For example, the fault frequency may indicate how many times a given fault has occurred during all driving cycles. In particular, the fault frequency may indicate how many brushfires have occurred overall or since the last diagnostic output. If the fault frequency is eleven, then the fault may have occurred eleven times since the last diagnostic output.

The fault priority may indicate the severity or the importance of the fault conditions to the user. For example, a fault priority of one may indicate a condition that has a strong influence on operability, such that the user should immediately stop operating the system. A fault priority of two may indicate a condition that requires an immediate service appointment. A fault priority of three may indicate a condition that does not require an immediate service appointment but should be corrected at the next service appointment.

Figure 8:
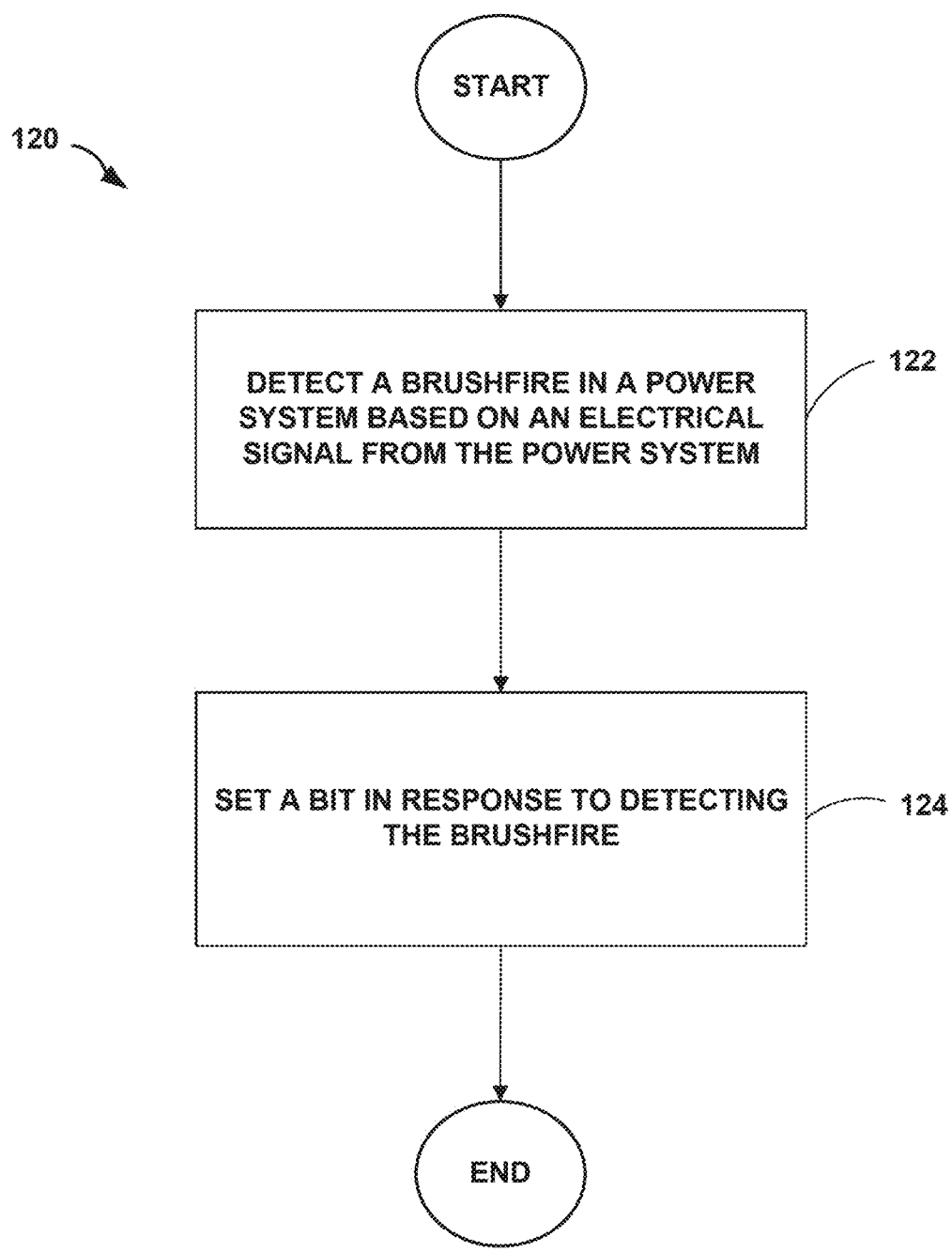
FIG. 8 is a flowchart illustrating an example process for detecting a brushfire in accordance with some examples of this disclosure.

FIG. 8 is a flowchart illustrating an example technique 120 implemented by a detection circuit to detect a brushfire and set a bit in accordance with some examples of this disclosure. Technique 120 is described from the perspective of detection circuit 80 in FIG. 5, although other components, such as brushfire detection circuit 50 in FIG. 2 and detection circuit 104 in FIG. 6, may perform similar techniques.

The technique 120 of FIG. 8 includes detecting a brushfire in a power system based on an electrical signal from the power system (122). The brushfire may generate and transmit the electrical signal to the EXC pin of an alternator control IC. The alternator control IC may include a filter circuit to modulate or filter the electrical signal and deliver it to detection circuit 80. The brushfire may also generate an electromagnetic wave, which an antenna may receive and convert to an electrical signal. The antenna may transmit the electrical signal to detection circuit 80.

Technique 120 may also include setting a bit in response to detecting the brushfire (124). The bit may include diagnostic information indicating one or more characteristics of the brushfire. Control unit 96 may output the diagnostic information indicating the brushfire to a user interface. The user interface may be a diagnostic tool that scans the components in a system and displays information to a user.

Figure 9:
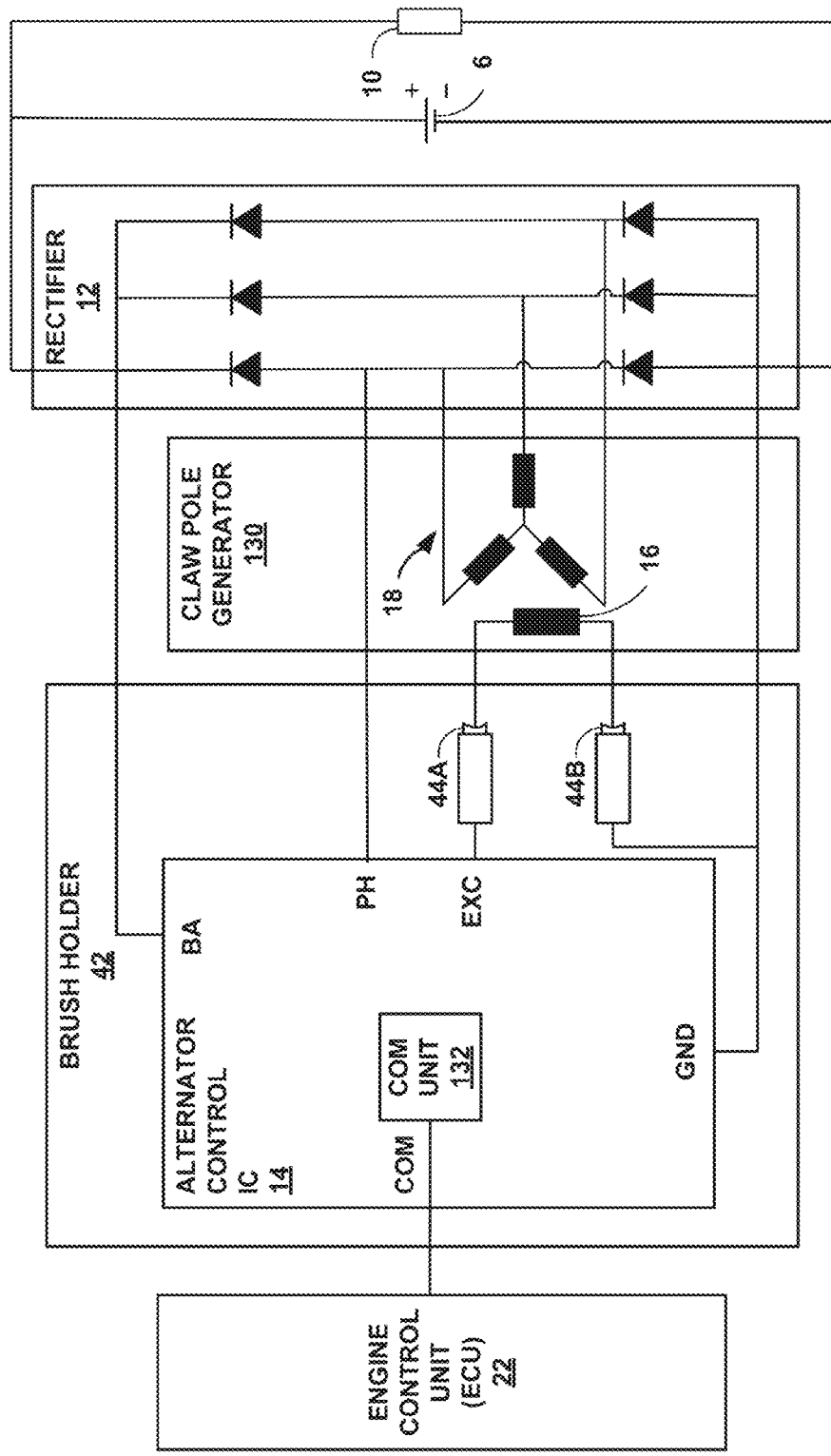
FIG. 9 is a conceptual block diagram of an alternator control IC in communication with an engine control unit in accordance with some examples of this disclosure.

FIG. 9 is a conceptual block diagram of an alternator control IC 14 in communication with an engine control unit 22 in accordance with some examples of this disclosure. Alternator control IC 14 may communicate with ECU 22 through communication (com) unit 132 and a COM pin. ECU 22 may fetch or read a bit in alternator control IC 14 through the COM pin in a time raster or on request by a fault pin.

Claw pole generator 130 may include rotor 16 and stator windings 18. Claw pole generator 130 may be similar in operation to alternator 4 in FIG. 2.

Figure 10:
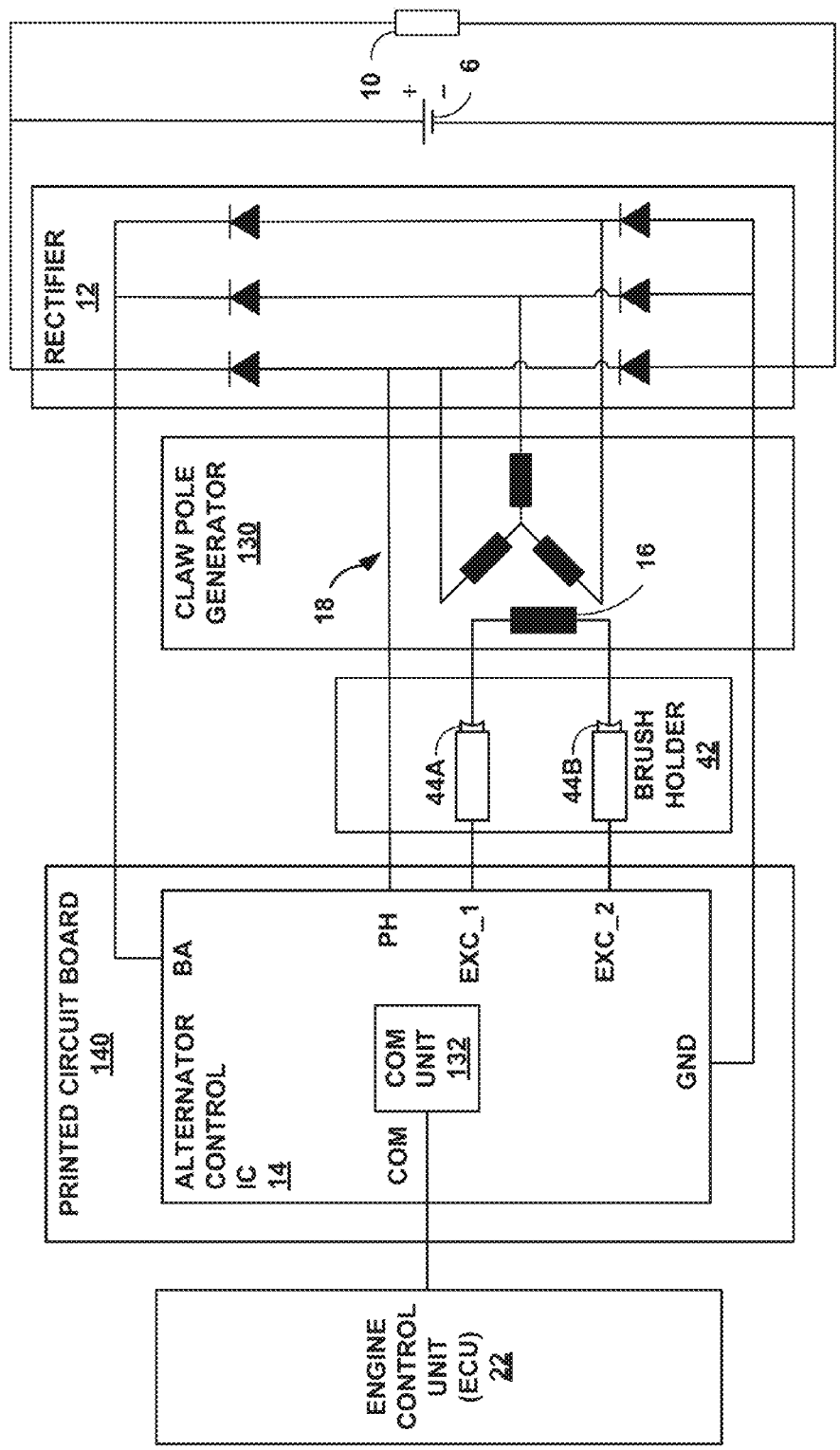
FIG. 10 is a conceptual block diagram of an alternator control IC outside of the brush holder in accordance with some examples of this disclosure.

FIG. 10 is a conceptual block diagram of an alternator control IC 14 outside of the brush holder 42 in accordance with some examples of this disclosure. Alternator control IC 14 may be attached to printed circuit board 140 with two excitation (EXC_1 and EXC_2) pins. The excitation pins may connect to brushes 44A, 44B in brush holder 42.

Figure 11:
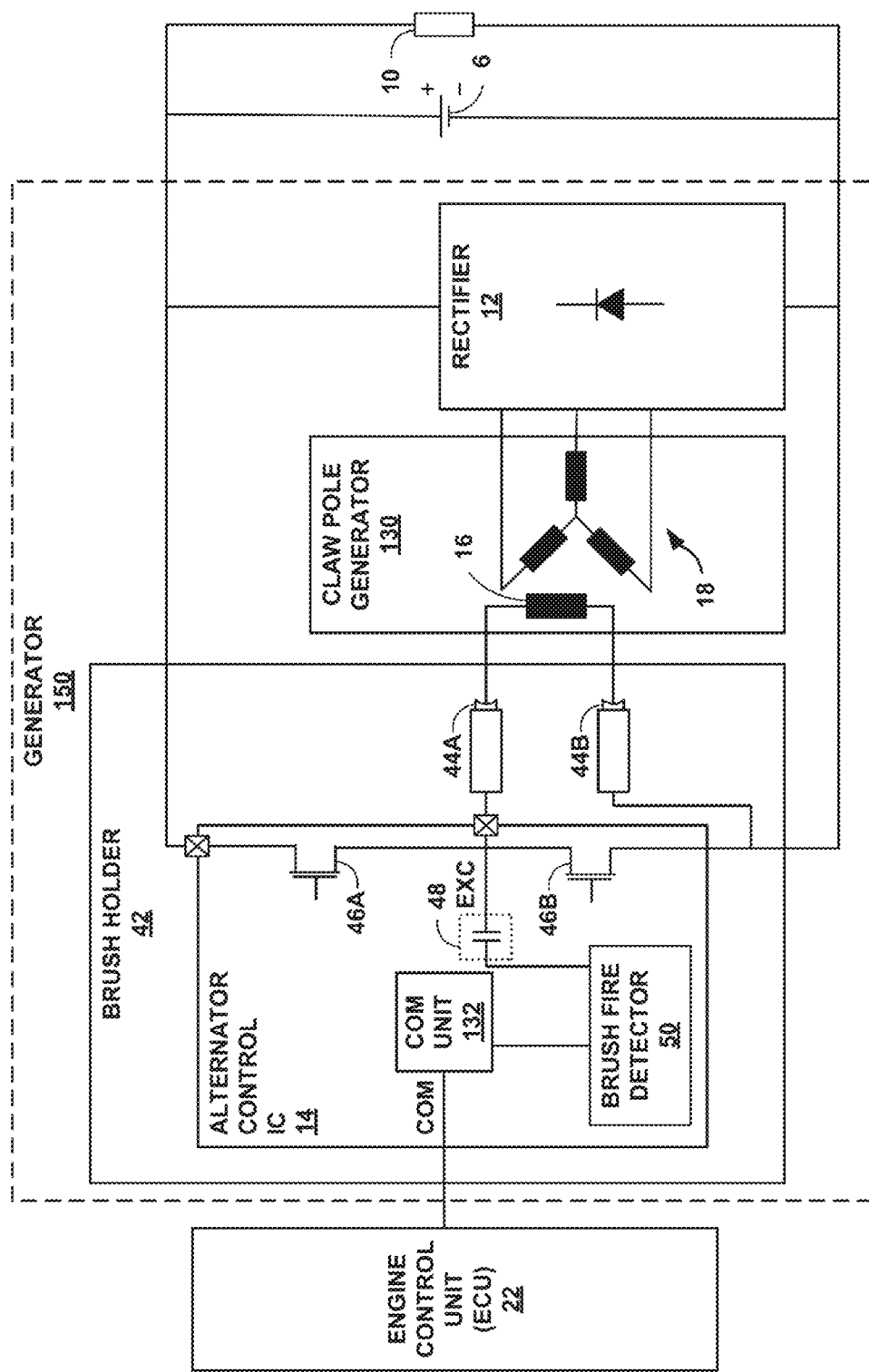
FIG. 11 is a conceptual block diagram of an alternator control IC with an integrated contact-based brushfire detector in accordance with some examples of this disclosure.

FIG. 11 is a conceptual block diagram of an alternator control IC 14 with an integrated contact-based brushfire detector 48 in accordance with some examples of this disclosure. Integrated contact-based brushfire detector 48 may comprise a capacitor coupled to the EXC pin of alternator control IC 14. Generator 150 may comprise alternator control IC 14. In some examples, generator 150 may be any power system with a brush.

Figure 12:
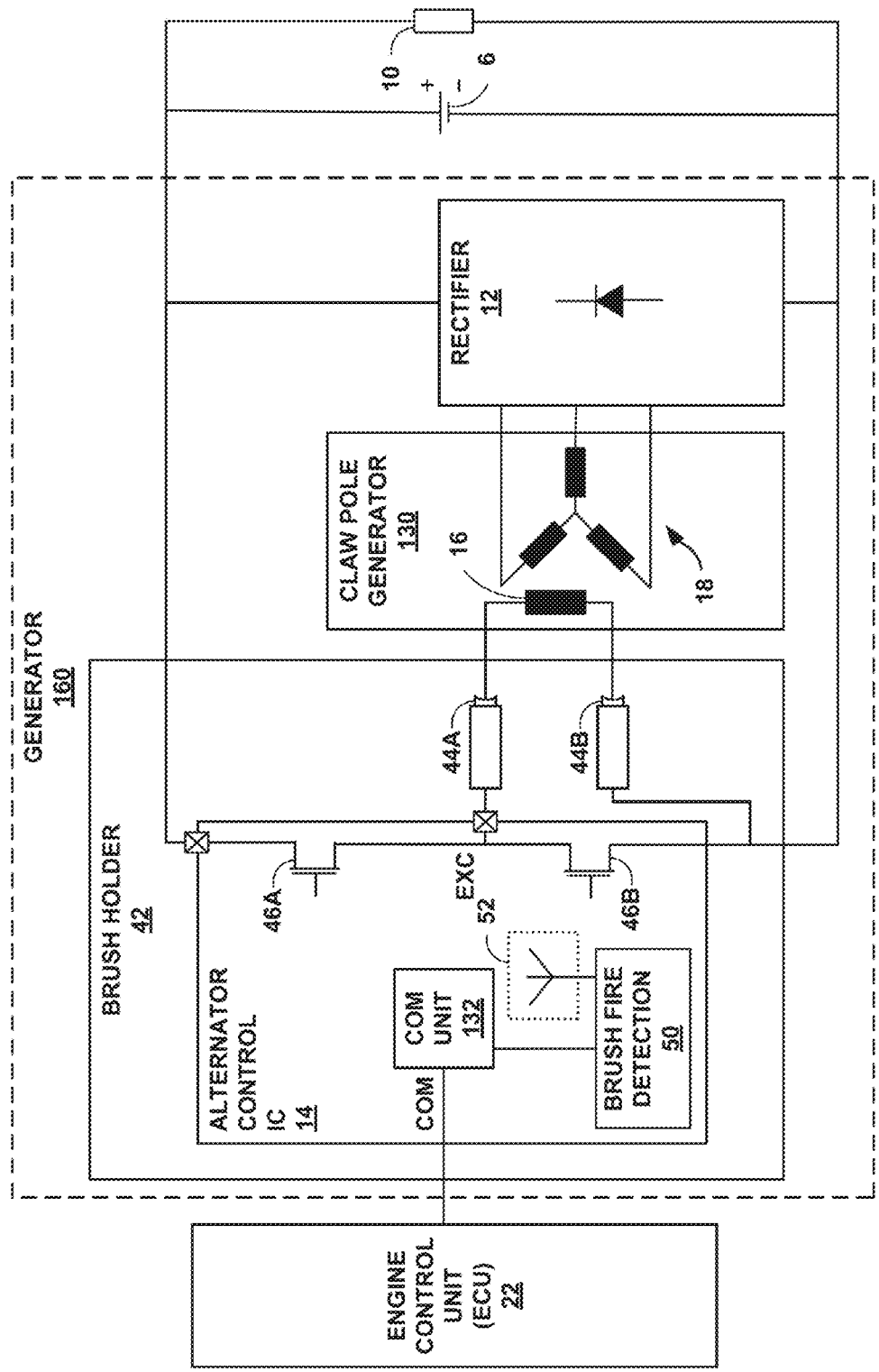
FIG. 12 is a conceptual block diagram of an alternator control IC with an integrated wireless brushfire detector in accordance with some examples of this disclosure.

FIG. 12 is a conceptual block diagram of an alternator control IC 14 with an integrated wireless brushfire detector 52 in accordance with some examples of this disclosure. Generator 160 may comprise brush fire detection circuit 50 connected to integrated wireless brushfire detector 52 inside alternator control IC 14. Detector 52 may comprise a coil antenna, a dipole antenna, or any device for sensing electromagnetic signals.

Figure 13:
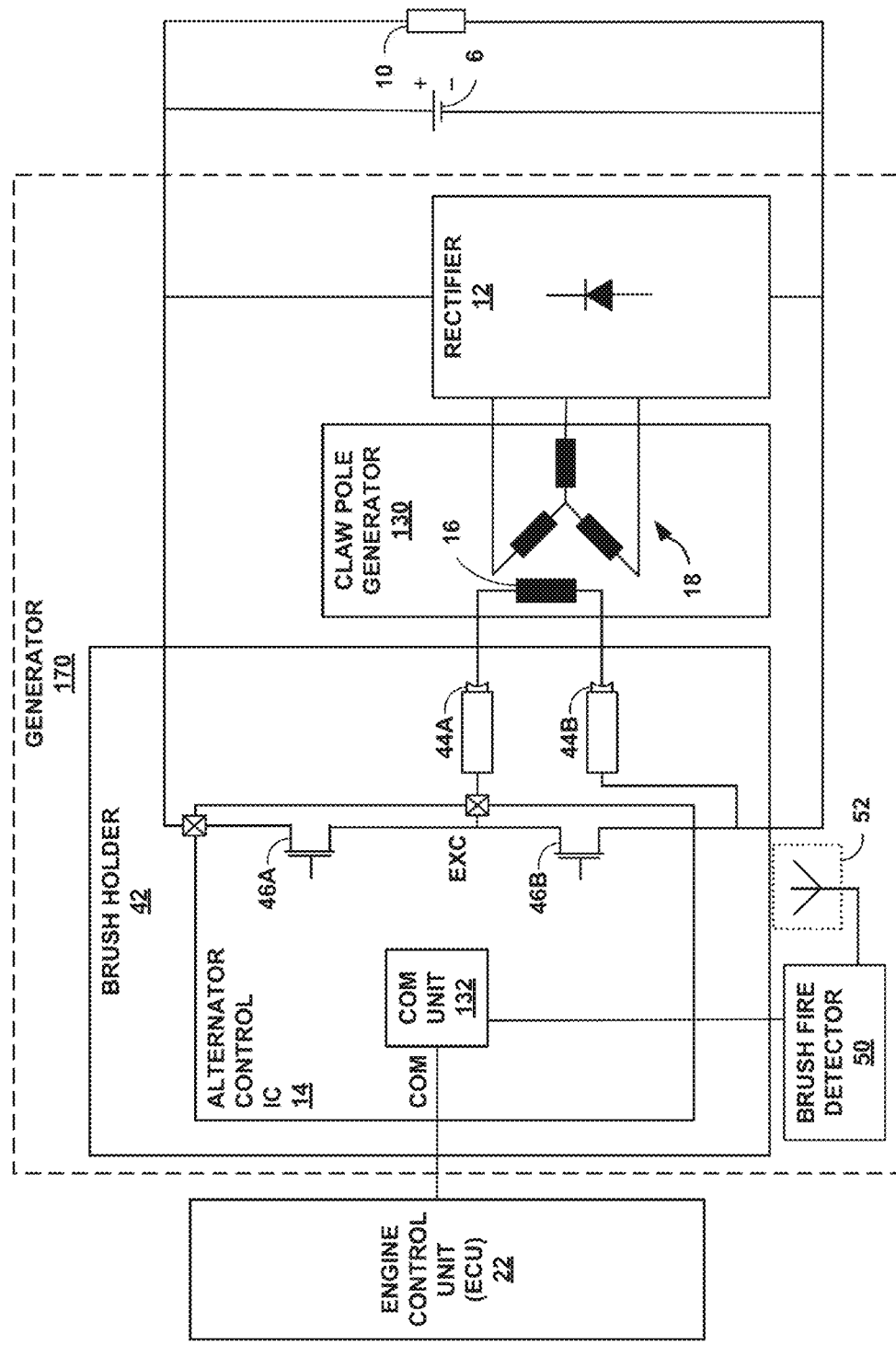
FIG. 13 is a conceptual block diagram of an alternator control IC with a discrete wireless brushfire detector in accordance with some examples of this disclosure.

FIG. 13 is a conceptual block diagram of an alternator control IC 14 with a discrete wireless brushfire detector 52 in accordance with some examples of this disclosure. Generator 170 may comprise discrete wireless brushfire detector 52 outside of alternator control IC 14.

Figure 14:
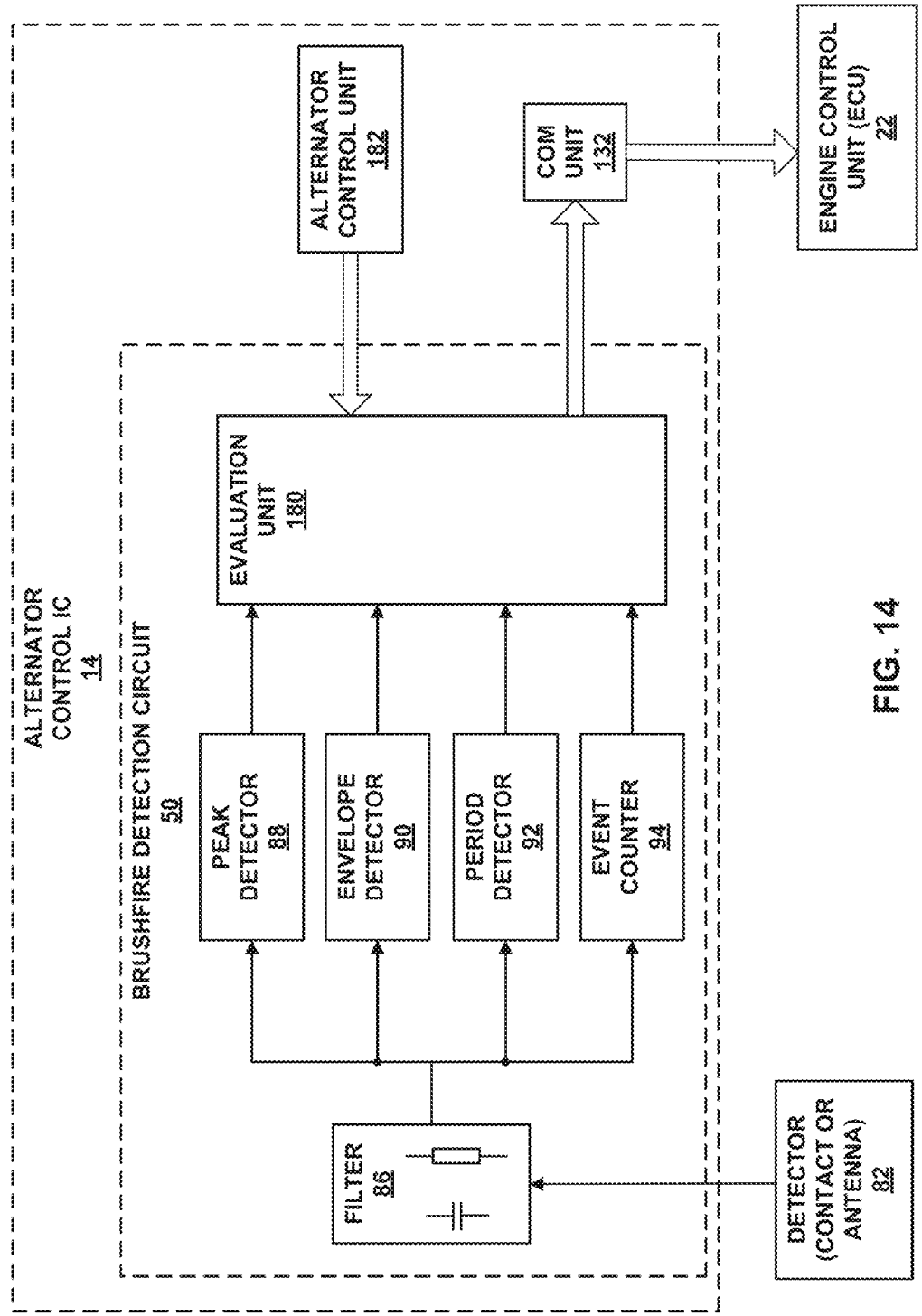
FIG. 14 is a conceptual block diagram of an alternator control IC with an evaluation unit in accordance with some examples of this disclosure.

FIG. 14 is a conceptual block diagram of an alternator control IC 14 with an evaluation unit 180 in accordance with some examples of this disclosure. Alternator control IC 14 may use operating information received from any of the pins to detect a brushfire and to verify the detection of a possible brushfire. Alternator control IC 14 may verify, validate, or bolster the detection of a possible brushfire by measuring operating information from the pins and internal stored data. Operating information may include the load current through the rotor, the rotational velocity of the rotor, the duty cycle of the stator current(s), state machine data or data stored in memory about past events, pole pair count for alternator 4, and other IC input pin information. Alternator control IC 14 may validate a brushfire detection by comparing the measured operating information to one or more threshold values. The detection of a brushfire may be valid only under certain conditions, such as in a certain operating mode or above a certain load current. Alternator control IC 14 may also measure the temperature of the IC or brush holder 42, or employ optical detection of sparks, to detect or validate a brushfire. Alternator control IC 14 may use operating information received from the pins to validate the brushfire detection before setting of a bit or an error flag. The use of multiple data sources and multiple detection methods may improve the detection of brushfires and reduce false positives.

Evaluation unit 180 may combine information from wireless and contact-based detectors, along with operation information, to detect a brushfire. Alternator control unit 182 may define the excitation current and provide operating information to evaluation unit 180. ECU 22 may read a bit or an error flag in alternator control IC 14 through com unit 132 and store the bit or error flag in memory in ECU 22.

Figure 15:
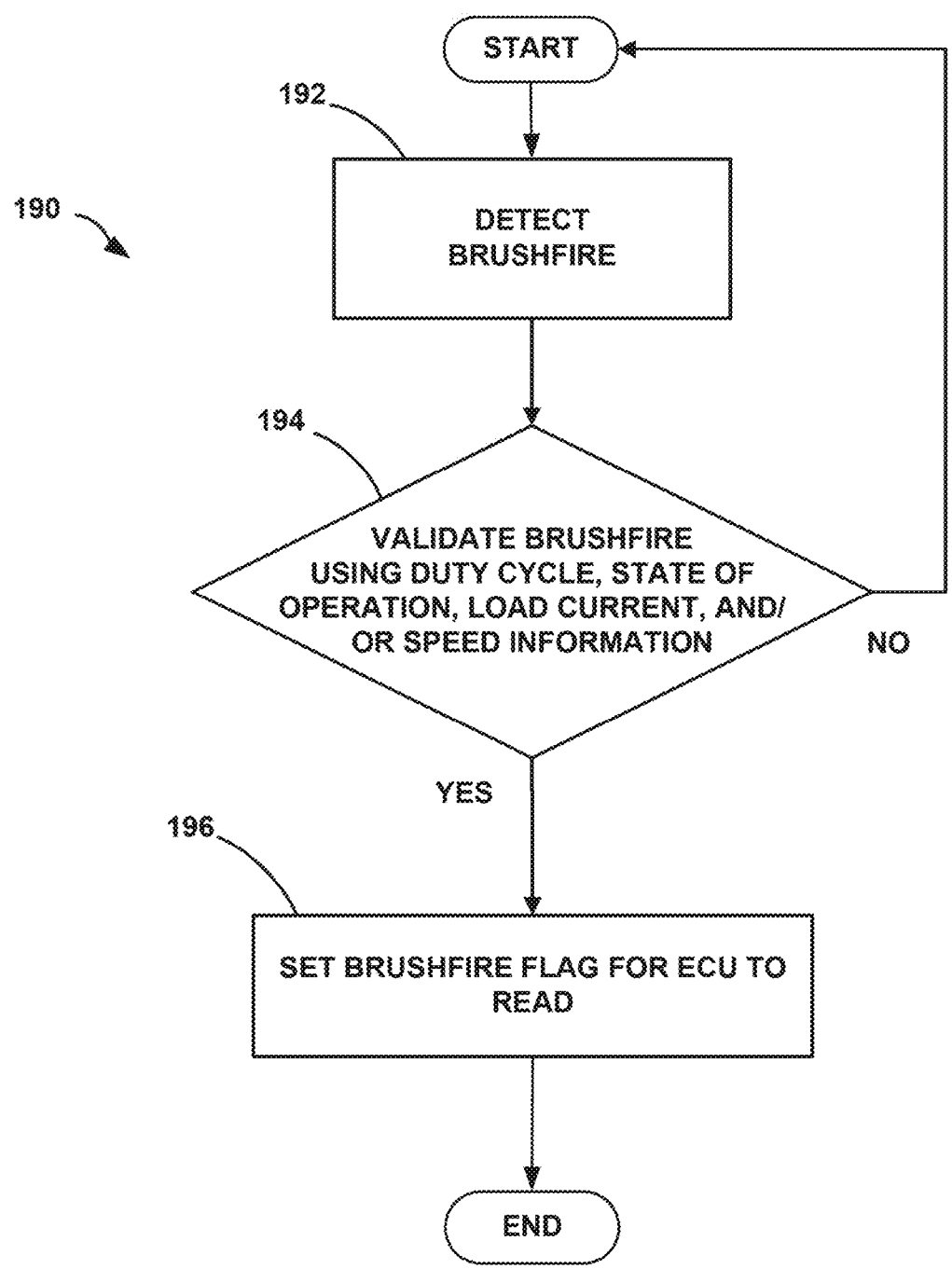
FIG. 15 is a flowchart illustrating an example process for validating a brushfire in accordance with some examples of this disclosure.

FIG. 15 is a flowchart illustrating an example process 190 for validating a brushfire in accordance with some examples of this disclosure. Process 190 is described from the perspective of evaluation unit 180 in FIG. 5, although other components, such as brushfire detection circuit 50 in FIG. 2 and detection circuit 104 in FIG. 6, may perform similar techniques.

The process 190 of FIG. 15 includes detecting a brushfire (192). Detector 82 may receive an electrical signal and provide the signal to brushfire detection circuit 50.

The process 190 of FIG. 15 further includes validating the brushfire using operating information such as duty cycle, state of operation, load current, and/or speed information (194). If evaluation unit 180 does not validate the brushfire, process 190 returns to the initial stage of detecting a brushfire. If evaluation unit 180 validates the brushfire, evaluation unit 180 sets the brushfire flag in alternator control IC 14 for ECU 22 to read (196).

Evaluation unit 180 may prevent or reduce false disturbance detection by distinguishing electromagnetic disturbances caused by brushfires from electromagnetic disturbances that occur without a brushfire. Evaluation unit 180 may include appropriate detection hardware, either in the form of electronic signal filtering circuitry (contact-based) and/or wireless detection capabilities (i.e., antenna). Since alternator control IC 14 may not respond immediately to the brushfire event, brushfire detection circuit 50 may employ a detection window of a few seconds to a few hours.

The following numbered examples demonstrate one or more aspects of the disclosure.

Example 1

A detection circuit configured to detect a brushfire in a power system based on an electrical signal from the power system. The detection circuit is further configured to set a bit in response to detecting the brushfire.

Example 2

The detection circuit of example 1, wherein the detection circuit is coupled to an antenna configured to receive an electromagnetic wave generated by the brushfire. The antenna is further configured to convert the electromagnetic wave to the electrical signal and deliver the electrical signal to the detection circuit.

Example 3

The detection circuit of any combination of examples 1-2, wherein the antenna and the detection circuit are located in a brush holder in the power system. The brush holder is configured to press a brush against a rotor in the power system, and the power system comprises an alternator, an electric generator, or an electric motor.

Example 4

The detection circuit of any combination of examples 1-3, wherein the detection circuit is coupled to a filter circuit including a capacitor. The filter circuit is configured to receive the electrical signal indicating the brushfire, filter the electrical signal, and deliver the electrical signal to the detection circuit.

Example 5

The detection circuit of any combination of examples 1-4, wherein the filter circuit and the detection circuit are located in a brush holder in the power system. The brush holder is configured to press a brush against a rotor in the power system, and wherein the power system comprises an alternator, an electric generator, or an electric motor.

Example 6

The detection circuit of any combination of examples 1-5, wherein the detection circuit is configured to detect the brushfire by at least receiving the electrical signal from the power system and measuring one or more characteristics of the electrical signal. The one or more characteristics include a peak amplitude of the electrical signal, a duration of the electrical signal, or a frequency of the electrical signal.

Example 7

The detection circuit of any combination of examples 1-6, further comprising an AC/DC converter and an impedance element configured to establish a time constant, wherein the impedance element is coupled between the AC/DC converter and a reference ground.

Example 8

The detection circuit of any combination of examples 1-7, further configured to set a bit by at least setting an error flag in a memory device in response to detecting the brushfire. The bit indicates one or more characteristics of the brushfire including a duration of the brushfire, a frequency of the brushfire, or a number of the brushfire.

Example 9

A method includes detecting a brushfire in a power system based on an electrical signal from the power system, and setting a bit in response to detecting the brushfire.

Example 10

The method of example 9, wherein detecting the brushfire comprises receiving, by an antenna, an electromagnetic wave generated by the brushfire, and converting, by the antenna, the electromagnetic wave to the electrical signal.

Example 11

The method of any combination of examples 9-10, wherein detecting the brushfire comprises receiving, by a filter circuit including a capacitor, the electrical signal, and filtering, by the filter circuit, the electrical signal.

Example 12

The method of any combination of examples 9-11, wherein setting the bit comprises setting an error flag in a memory device in response to detecting the brushfire, the method further comprising outputting, by the control unit and based on reading the error flag, diagnostic information indicating the brushfire to a user interface, wherein the diagnostic information includes a peak amplitude of the brushfire or a number of brushfires.

Example 13

The method of any combination of examples 9-12, wherein detecting the brushfire comprises converting the electrical signal to a smoothed signal, and measuring one or more characteristics of the electrical signal, wherein the one or more characteristics include a peak amplitude of the electrical signal, a duration of the electrical signal, or a frequency of the electrical signal.

Example 14

A system comprising: a rotating shaft, one or more brushes configured to conduct electricity with the rotating shaft, a control unit, and a detection circuit configured to detect a brushfire between the rotating shaft and the one or more brushes based on an electrical signal. The detection circuit is further configured to set a bit in response to detecting the brushfire.

Example 15

The system of example 14, further comprising an antenna coupled to the detection circuit. The antenna is configured to receive an electromagnetic wave generated by the brushfire, convert the electromagnetic wave to the electrical signal, and deliver the electrical signal to the detection circuit.

Example 16

The system of any combination of examples 14-15, further comprising a filter circuit coupled to the detection circuit and coupled to at least one brush of the one or more brushes, wherein the filter circuit includes a capacitor. The filter circuit is configured to receive the electrical signal indicating the brushfire from the at least one brush, filter the electrical signal, and deliver the electrical signal to the detection circuit.

Example 17

The system of any combination of examples 14-16, wherein the detection circuit is configured to set the bit by at least setting an error flag in a memory device in response to detecting the brushfire.

Example 18

The system of any combination of examples 14-17, wherein the control unit is configured to read the bit, and output diagnostic information indicating the brushfire to a user interface, wherein the diagnostic information includes a peak amplitude of the brushfire or a number of brushfires.

Example 19

The system of any combination of examples 14-18, wherein the detection circuit is configured to detect the brushfire by at least measuring one or more characteristics of the electrical signal, wherein the one or more characteristics include a peak amplitude of the electrical signal, a duration of the electrical signal, or a frequency of the electrical signal.

Example 20

The system of any combination of examples 14-19, wherein the detection circuit further comprises an AC/DC converter configured to receive the electrical signal, and an impedance element configured to establish a time constant, wherein the impedance element is coupled between the AC/DC converter and a reference ground.

Example 21

A controller configured to: read a bit stored by a brushfire detection circuit or an alternator control circuit, and in response to reading the bit, generate an alert identifying an occurrence of a brushfire.

Example 22

The controller of example 21, wherein the controller is configured to generate the alert by at least outputting diagnostic information indicating the brushfire to a user interface, wherein the diagnostic information includes a peak amplitude of the brushfire or a number of brushfires.

Example 23

The detection circuit of any combination of examples 1-8, wherein the detection circuit is configured to detect the brushfire by at least measuring operating information indicating at least one of load current, rotational velocity, duty cycle, state-machine state, pole pair count, or pin input information.

Example 24

The detection circuit of any combination of examples 1-8 or 23, further configured to validate the detected brushfire by comparing the measured operating information to a threshold value.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded with instructions, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A control circuit for a power system comprising:
 a detection circuit that is coupled to an antenna and a filter circuit including a capacitor,
  wherein the antenna is configured to:
   receive an electromagnetic wave generated by a brushfire in the power system;
   convert the electromagnetic wave to an electrical signal; and
   deliver the electrical signal to the detection circuit,
  wherein the detection circuit is configured to detect the brushfire based on the electrical signal, and
  wherein the filter circuit is configured to:
   receive the electrical signal indicating the brushfire;
   filter the electrical signal; and
   deliver the electrical signal to the detection circuit.

2. The control circuit of claim 1,
 wherein the antenna is located in the control circuit.

3. The control circuit of claim 1,
 wherein the antenna is located in a brush holder in the power system;
 wherein the brush holder is configured to press a brush against a rotor in the power system; and
 wherein the power system comprises an alternator, an electric generator, or an electric motor.

4. The control circuit of claim 3, wherein the detection circuit is located in the brush holder in the power system.

5. The control circuit of claim 1,
 wherein the detection circuit is
 further configured to set a bit in response to detecting the brushfire.

6. The control circuit of claim 5, wherein the detection circuit is configured to set the bit by at least setting an error flag in a memory device in response to detecting the brushfire;
 wherein the error flag indicates one or more characteristics of the brushfire; and
 wherein the one or more characteristics include a duration of the brushfire, a frequency of the brushfire, or a number of the brushfire.

7. The control circuit of claim 5, wherein:
 the detection circuit is further configured to receive a request for the bit from a control unit; and
 the detection circuit is configured to output a signal indicating a status of the bit to the control unit by at least communicating a status to the control unit.

8. The control circuit of claim 1,
wherein the filter circuit is located in a brush holder in the power system;
wherein the detection circuit is located in the brush holder in the power system;
wherein the brush holder is configured to press a brush against a rotor in the power system; and
wherein the power system comprises an alternator, an electric generator, or an electric motor.

9. The control circuit of claim 1, wherein the detection circuit is configured to detect the brushfire by at least:
receiving the electrical signal from the power system; and
measuring one or more characteristics of the electrical signal, wherein the one or more characteristics include a peak amplitude of the electrical signal, a duration of the electrical signal, or a frequency of the electrical signal.

10. The control circuit of claim 1, further comprising:
an AC/DC converter; and
an impedance element configured to establish a time constant, wherein the impedance element is coupled between the AC/DC converter and a reference ground.

11. The control circuit of claim 1, wherein the detection circuit is configured to detect the brushfire by at least measuring operating information indicating at least one of load current, rotational velocity, duty cycle, state-machine state, pole pair count, or pin input information.

12. The control circuit of claim 1, further configured to validate the detected brushfire by comparing the measured operating information to a threshold value.

13. A method comprising:
receiving, by an antenna, an electromagnetic wave generated by a brushfire in a power system;
converting, by the antenna, the electromagnetic wave to an electrical signal;
receiving, by a filter circuit including a capacitor, the electrical signal;
filtering, by the filter circuit, the electrical signal; and
detecting the brushfire based on the electrical signal.

14. The method of claim 13, further comprising setting a bit in response to detecting the brushfire.

15. The method of claim 14, wherein setting the bit comprises setting an error flag in a memory device, the method further comprising:
outputting, by a control unit and based on reading the error flag, diagnostic information indicating the brushfire to a user interface, wherein the diagnostic information includes a peak amplitude of the brushfire or a number of brushfires.

16. The method of claim 13, wherein detecting the brushfire comprises:
converting the electrical signal to a smoothed signal; and
measuring one or more characteristics of the electrical signal, wherein the one or more characteristics include a peak amplitude of the electrical signal, a duration of the electrical signal, or a frequency of the electrical signal.

17. A system comprising:
a rotating shaft;
one or more brushes configured to conduct electricity with the rotating shaft;
a control unit;
a detection circuit; and
an antenna coupled to the detection circuit and configured to:
receive an electromagnetic wave generated by a brushfire between the rotating shaft and the one or more brushes;
convert the electromagnetic wave to an electrical signal; and
deliver the electrical signal to the detection circuit,
wherein the detection circuit is configured to:
detect the brushfire based on the electrical signal.

18. The system of claim 17, further comprising a brush holder configured to press a brush of the one or more brushes against the rotating shaft, wherein the antenna is located in the brush holder.

19. The system of claim 17, further comprising:
a filter circuit coupled to the detection circuit and coupled to at least one brush of the one or more brushes, wherein the filter circuit includes a capacitor;
wherein the filter circuit is configured to:
receive the electrical signal indicating the brushfire from the at least one brush;
filter the electrical signal; and
deliver the electrical signal to the detection circuit.

20. The system of claim 17,
wherein the detection circuit is further configured to set a bit in response to detecting the brushfire,
wherein the control unit is configured to:
read the bit; and
output diagnostic information indicating the brushfire to a user interface, wherein the diagnostic information includes a peak amplitude of the brushfire or a number of brushfires.

* * * * *